United States Patent [19]

Lefebvre

[11] 4,068,477
[45] Jan. 17, 1978

[54] DEVICE FOR CONTROLLING ACCESSORIES DRIVEN BY THE ENGINE OF A VEHICLE HAVING AN ASSISTED STEERING

[75] Inventor: Pascal Lefebvre, Paris, France

[73] Assignee: Automobiles Peugeot, Paris, France

[21] Appl. No.: 772,570

[22] Filed: Feb. 28, 1977

[30] Foreign Application Priority Data

Mar. 1, 1976 France .................................. 76 05727

[51] Int. Cl.² .......................... F01B 21/00; F04B 49/08
[52] U.S. Cl. .................................... 60/698; 60/DIG. 2; 62/133; 62/323
[58] Field of Search ................. 60/403, 423, 431, 435, 60/438, 668, 702, 698; 62/133, 323; 180/141, 142

[56] References Cited

U.S. PATENT DOCUMENTS

| | | | |
|---|---|---|---|
| 3,142,160 | 7/1964 | Hiyoshi et al. | 62/323 X |
| 3,462,964 | 8/1969 | Haroldson | 62/133 |
| 3,992,885 | 11/1976 | Forster | 60/698 |

Primary Examiner—Edgar W. Geoghegan
Attorney, Agent, or Firm—Burns, Doane, Swecker & Mathis

[57] ABSTRACT

The device controls at least one accessory which operates in an intermittent manner and is driven through a connection by the engine of the vehicle. The latter has a hydraulic steering assistance supplied with fluid under pressure through a delivery pipe by a pump which is driven by the engine through an electromagnetic clutch. A fluid pressure-switch is connected in the electric circuit of the clutch and inserted in the delivery pipe and cuts off the aforementioned connection when the delivery pressure of the pump reaches a predetermined threshold value.

2 Claims, 1 Drawing Figure

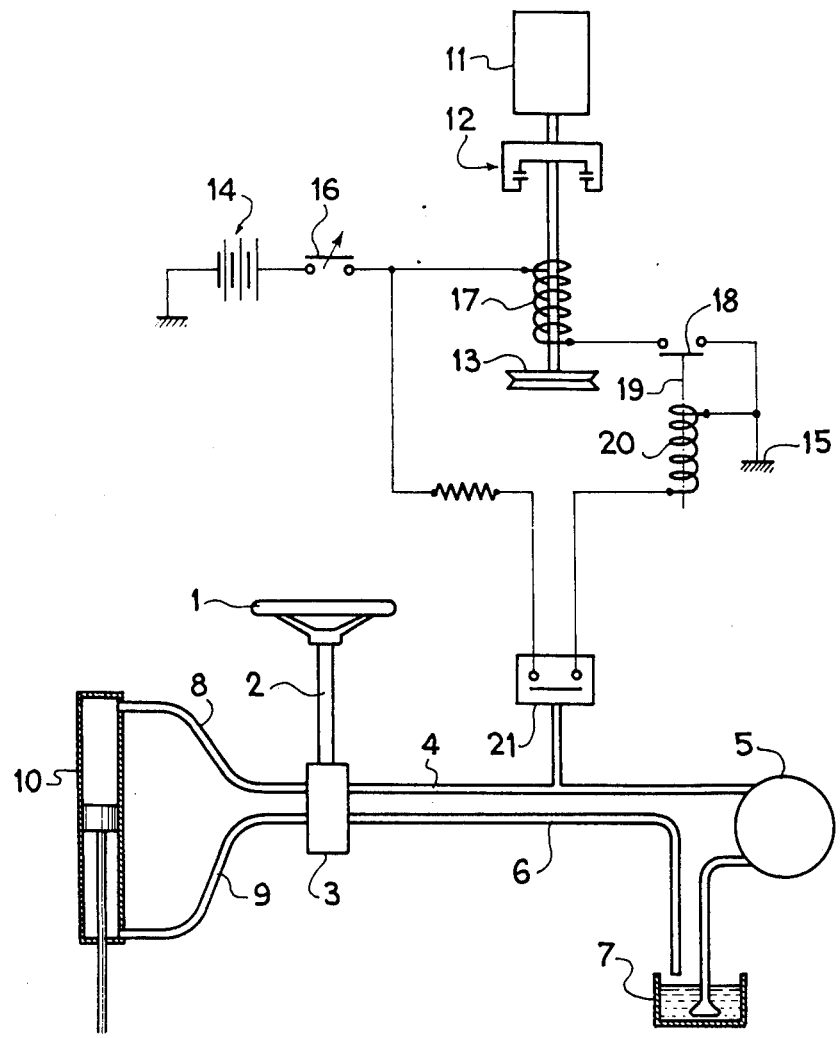

DEVICE FOR CONTROLLING ACCESSORIES DRIVEN BY THE ENGINE OF A VEHICLE HAVING AN ASSISTED STEERING

The present invention relates to deivces for controlling accessories driven by a heat engine of an automobile vehicle which is provided with an assisted steering.

In automobile vehicles, the number of accessories that the heat engine must drive tends to increase. There may be mentioned, for example, an alternator, a cooling compressor, a hydraulic pump assisting the steering, a vacuum pump for Diesel engines etc.

However, all these accessories do not absorb a constant amount of power.

In particular, the resisting torque of the hydraulic pump assisting the steering is low under normal conditions of operation, for example on the order of 0.5 m/kg, but it becomes considerable and may be on the order of 2.5 m/kg, under certain rare cases for very brief periods.

These peaks appear when parking the vehicle while the engine is operating at idling speed. If at the same time other accessories having an intermittent operation and a high resistant torque are already being driven by the engine, the latter may stall.

An object of the invention is to overcome this drawback.

According to the invention, there is provided a device for controlling at least one accessory having an intermittent operation driven by the heat engine of a vehicle, provided with a hydraulic steering assistance supplied with fluid under pressure by a pump driven by said heat engine, said accessory being driven through the agency of an electromagnetic clutch, wherein in the delivery conduit of the steering assistance pump there is disposed a pressure switch which is connected in the electric circuit controlling the electromagnetic clutch so as to cut off the connection between the heat engine and said accessory when the delivery pressure of the pump reaches a given threshold value.

Further features and advantages of the invention will be apparent from the ensuing description.

In the accompanying drawings given solely by way of example, the single FIGURE shows diagrammatically one embodiment of the invention.

This FIGURE shows a steering wheel 1 whose column 2 acts in the known manner on an assistance valve 3.

The latter receives by way of a pipe 4 liquid under pressure supplied by a pump 5 which is permanently driven by the heat engine (not shown) of the automobile vehicle.

Leading from the valve 3 is an exhaust pipe 6 leading to a tank 7 and two pipes 8, 9 each of which leads to one of the chambers of a steering assisting jack 10.

Moreover, the vehicle is provided with a cooling compressor 11 for the air conditioning of the driving and passenger compartment. This compressor is driven, through an electromagnetically controlled clutch 12, by a pulley 13 connected to the engine of the vehicle (not shown).

The control circuit of the clutch comprises, between a source 14 of electric current and earth 15, an adjustable thermostat 16, a coil 17 for actuating the clutch 12 and a normally-closed switch 18 for a relay 19.

The latter comprises a coil 20 connected between the source of current 14 and the earth 15 in series with a pressure-switch 21 which is responsive to the pressure which prevails in the delivery pipe 4 of the pump 5. The pressure switch 21 is open so long as this pressure is lower than a predetermined value.

The device just described operates in the following manner:

In normal utilization, the steering assistance is but little employed: a large part of the liquid delivered by the pump 5 returns to the tank 7 by way of the pipe 6, so that the pressure in the pipe 4 remains relatively low. The pressure-switch 21 remains open while the switch 18 remains closed, the starting up and the stoppage of the compressor 11 normally being controlled by the thermostat 16.

When great demands are being made on the steering assistance when parking the vehicle, the pressure increases in the pipe 4 at the same time as the resisting torque of the pump 5.

Beyond a given threshold of pressure, the pressure-switch 21 closes and this supplies current to the coil 20 of the relay 19 and results in the opening of the switch 18 and consequently the release of the clutch of the compressor 11, if the latter was in operation. The heat engine of the vehicle is thereby relieved of load and the stalling of the engine is avoided.

As the interruptions of the operation of the compressor are of very short duration, they have practically no effect on the air conditioning of the compartment.

It will be understood that any other accessory driven by the engine may be momentarily put out of action in the same way.

Having now described my invention what I claim as new and desire to secure by Letters Patent is :

1. In a device for controlling at least one accessory which operates in an intermittent manner and is driven through a connection by the heat engine of a vehicle which has a hydraulic steering assistance supplied with fluid under pressure through a delivery pipe by a pump driven by said engine, said accessory being driven by the engine through an electromagnetic clutch controlled by an electric circuit; the improvement comprising, disposed in said delivery pipe, a pressure-switch which is connected in said electric circuit controlling the clutch so as to cut off said connection when the delivery pressure of the pump reaches a predetermined threshold value.

2. A device as claimed in claim 1, comprising a relay having a coil and a switch associated with the coil to be actuated by the coil, the clutch having a control winding and said switch which is actuated by the coil, said pressure-switch being connected in series with the coil of the relay, an assembly comprising the pressure-switch and said coil being connected in parallel with an assembly comprising said control winding of said clutch and said switch actuated by said coil of said relay which are connected in series.

* * * * *